US007492785B2

(12) United States Patent
Seligman et al.

(10) Patent No.: US 7,492,785 B2
(45) Date of Patent: Feb. 17, 2009

(54) TIME SKEW CORRECTION IN DATA TIME STAMPING

(75) Inventors: Daniel R. Seligman, Needham, MA (US); David L. Shepard, Marlborough, MA (US); Mark W. Sylor, Nashua, NH (US); Gordon Booman, Berlin, MA (US); Lawrence A. Stabile, Cochituate, MA (US)

(73) Assignee: Computer Associates Think, Inc., Islandia, NY (US)

( * ) Notice: Subject to any disclaimer, the term of this patent is extended or adjusted under 35 U.S.C. 154(b) by 681 days.

(21) Appl. No.: 10/875,792

(22) Filed: Jun. 23, 2004

(65) Prior Publication Data

US 2005/0094661 A1 May 5, 2005

Related U.S. Application Data

(60) Provisional application No. 60/480,819, filed on Jun. 23, 2003.

(51) Int. Cl.
*H04L 12/42* (2006.01)
(52) U.S. Cl. ........................... 370/449; 370/503
(58) Field of Classification Search ................ 370/449, 370/503, 347, 350
See application file for complete search history.

(56) References Cited

U.S. PATENT DOCUMENTS 5,602,992 A * 2/1997 Danneels .................... 709/248
5,802,082 A    9/1998 Roppel ........................ 371/62
6,157,957 A   12/2000 Berthaud .................... 709/248
6,347,084 B1 * 2/2002 Hulyalkar et al. ........... 370/347
2003/0086425 A1 * 5/2003 Bearden et al. .............. 370/392

FOREIGN PATENT DOCUMENTS

EP          0 697 774 A1    2/1996

* cited by examiner

*Primary Examiner*—Brian D Nguyen
(74) *Attorney, Agent, or Firm*—Pillsbury Winthrop Shaw Pittman LLP

(57) ABSTRACT

A method of processing data received at a local system in response to polling a remote device, wherein the local system includes a local clock, the method involving: sending a first poll to the remote device; receiving a response from the remote device to the first poll, the response to the first poll containing data and a time stamp indicating when the remote device responded to the first poll; for the data received in response to the first poll, computing a first time by using both a time that was derived from the local clock for a previous poll of the remote device and also the time stamp contained in the response to the first poll; comparing the computed first time to information that the local system stored in connection with the first poll, wherein the information that the local system stored in connection with the first poll was derived from the local clock; and determining how to process the data received in response to the first poll based on comparing the computed first time to the information that the local system stored in connection with the first poll.

30 Claims, 3 Drawing Sheets

TIME SKEW CORRECTION IN DATA TIME STAMPING

This application claims the benefit of U.S. Provisional Application No. 60/480,819, filed Jun. 23, 2003.

TECHNICAL FIELD

This invention relates to network management systems and polling for data.

BACKGROUND OF THE INVENTION

Typically, network management systems use deltaTime to normalize counter differences, i.e., to convert counter differences into rates. This variable is defined as the time between the receipt of successive poll responses by the network management system and can be inaccurate if a poll response suffers inordinate delays in the polled agent, the network, or the network management server. This problem can affect the calculation of any reportable rate, such as bytes/second or packets/second. While it has limited impact on average rates over long time periods, inaccuracies are visible to customers in trend reports based on raw poll periods, reports featuring peak utilizations, etc. The situation tends to get worse as the load on the network management server, network, or polled device increases and resources available for processing poll responses are accordingly diminished.

SUMMARY OF THE INVENTION

In general, in one aspect, the invention addresses the problem of clock inaccuracies by making small, successive corrections to the normalization time in an effort to synchronize the clocks on the network management server and the polled device.

In general, in another aspect, the invention features a method of processing data received at a local system in response to polling a remote device, wherein the local system includes a local clock. The method involves: sending a first poll to the remote device; receiving a response from the remote device to the first poll, the response to the first poll containing data and a time stamp indicating when the remote device responded to the first poll; for the data received in response to the first poll, computing a first time by using both a time that was derived from the local clock for a previous poll of the remote device and also the time stamp contained in the response to the first poll; comparing the computed first time to information that the local system stored in connection with the first poll, wherein the information that the local system stored in connection with the first poll was derived from the local clock; and determining how to process the data received in response to the first poll based on comparing the computed first time to said information that the local system stored in connection with the first poll.

Other embodiments include one or more of the following features. Sending the first poll also involves storing a first poll transmit time that is derived from the local clock. Receiving the response to the first poll also involves storing a first poll response receipt time that is derived from the local clock. The information that the local system stored in connection with the first poll includes both the first poll transmit time and the first poll response receipt time. The method also involves generating the first information in connection with the first poll, wherein the first information includes a first poll transmit time and a first poll response receipt time, both of which are derived from the local clock. Determining how to process the data received in response to the first poll involves determining whether the computed first time falls within a first range derived from the information; and if the computed first time falls within the first range derived from the information then storing the data received in response to the first poll and time stamping the stored data with the computed first time. Determining how to process the data received in response to the first poll also involves: determining whether the computed first time falls outside of the first range but within a second range that is also derived from the information; and if the computed first time falls outside of the first range but within the second range, applying a correction to the computed first time to generate a first corrected time, storing the data received in response to the first poll, and time stamping the stored data with the first corrected time. Determining how to process the data received in response to the first poll further involves: determining whether the computed first time falls outside of the second range; and if the computed first time falls outside of the second range, discarding the data received in response to the first poll.

In general, in another aspect, the invention features a computer readable medium storing a program which when executed on a processor in a computer system that includes a local clock causes the computer system to: send a first poll to a remote device; receive a response from the remote device to the first poll, the response to the first poll containing data and a time stamp indicating when the remote device responded to the first poll; for the data received in response to the first poll, compute a first time by using both a time that was derived from the local clock for a previous poll of the remote device and also the time stamp contained in the response to the first poll; compare the computed first time to information that the local system stored in connection with the first poll, wherein the information that the local system stored in connection with the first poll was derived from the local clock; and determine how to process the data received in response to the first poll based on comparing the computed first time to the information that the local system stored in connection with the first poll.

One or more embodiments of the invention include program code that implements the features and characteristics similar to those previously described above.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
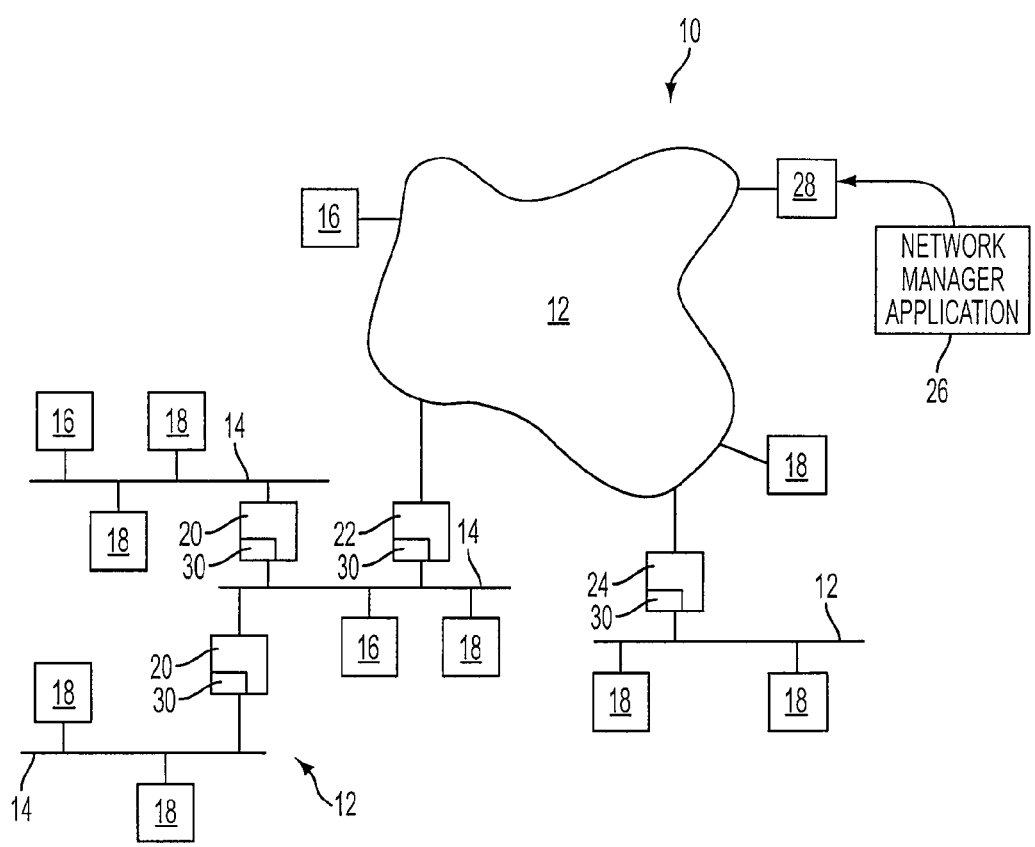
FIG. 1 is a diagram of a representative network.

FIG. 1 shows a network that is representative of the type in which the invention described herein can be implemented. This particular network 10 includes multiple LANs (Local Area Networks) 12 some of which are made up of multiple LAN segments 14. Connected to the LANs and LAN segments are various network devices including servers 16 and clients 18. Servers 16 are computer systems that support a set of clients 18 in different ways and clients 18, which are commonly desktop computers, drive the computing process, support local processing and access remote serves as needed.

Among the various interconnecting devices that connect parts of the network together are bridges 20, which interconnect LAN segments, and routers 22 and switches 24, which interconnect LANs.

The network management function is implemented by a network manager application 26, which runs on a network management server (NMS) 28, and a set of agents 30 that are distributed through the network. Agents 30 are engineered to integrate with the various network devices, computers and applications with which they are associated and they collect management information for network manager application 26. Network manager application 26 controls the set of agents 30 and ensures that they collect the appropriate information from the devices with which they are associated. Management applications use collected and historical information. The network manager server includes the standard array of components found in such devise including one or more processors, RAM and non-volatile memory for storing data and program code for the algorithms described herein, and interfaces that enable it to connect to the network.

In the described embodiment, the network manager applications periodically poll devices using SNMP (Simple Network Management Protocol) to check for the status of variables stored in various data structures that the agent maintains. The various data structures are maintained by the various agents include: MIB (Management Information Database); MIB2; RMON; and RMON2. MIB is part of the SNMP standard. Each type of managed resource on a network has a MIB, which contains what can be known about the resource and what can be done about it., e.g. its speed, protocols supported, and current status. MIB2 is a standard MIB that defines basic interface information such as speed, numbers of packets sent and received, numbers of broadcast and unicast packets, and errors. Usually every network device and interface card has one. RMON is remote monitoring MIB that controls an agent monitoring a single LAN segment. It collects information as instructed about traffic levels, which systems are talking, and specific conversations between two parties. RMON2 is a MIB for controlling agents that monitor traffic across the network. It measures traffic flows between different parts of the network and identifies which protocols and applications are being used by each system. SNMP, MIB, MIB2, RMON and RMON2 are all publicly specified protocols or entities with which persons of ordinary skill in the art are familiar.

A key part of the management toolset that is implemented by the network manager application includes various reporting and analysis tools. They are used to organize large volumes of polled data into the information that is needed by the network managers. They include the ability to implement sophisticated analysis to identify trends and evaluate the health of the network.

The network manager application polls the agents for various counter values and the agents respond to the polls by sending the requested values back. For each counter for which the agent supplies information, it identifies the counter, the present count, and a time stamp indicating when the response to the poll occurs. The agent derives the time stamp from device clock on the local computer. From the responses that are received, the network manager application computes by how much each reported count has changed since the last time it was polled and it stores that information in a database that is local to the computer on which the network manager application is running along with a time stamp derived from the local clock. In other words, if the particular counter relates to packet counts, the stored value represents the number of packets that have been detected since the last poll. For each counter for which the network manager application is maintaining information, it also stores the last count value, which it will use for the next poll response to compute the change that has occurred since the last poll.

For some of the reports that are generated by the network manager application (or by a separate report generating application), these stored counts are normalized to produce an average rate for the poll period. That is, the stored number is divided by the duration of the period to which the stored value corresponds.

To be precise, consider a monotonically increasing counter on a polled device. Let $c_n$ represent the value of the counter at time $t_n$ where $t_n$ is the time the device responds to a poll from the network manager application; and let $c_{n+1}$ represent the value of the counter at $t_{n+1}$ where $t_{n+1}$ is the time the device responds to the next poll from the network manager application. Then, the average rate for the poll period $[t_n, t_{n+1}]$ is:

$$(c_{n+1} - c_n)/(t_{n+1} - t_n)$$

In a network management system, when measuring time differences two different frames of reference need to be considered. One frame of reference is that of the network management server and the clock it uses to measure time. The other frame of reference is that of the monitored device and the clock it uses to measure time.

In principle, counter difference normalization should in theory be based on the time between the transmission of successive SNMP poll responses by the agent based on the polled device clock, since the polled device time is the frame of reference of the polled counters. This variable is called deltaSysUpTime and is itself obtained by the network manager application by taking the difference between successive polled values of the device system time. Unfortunately, using deltaSysUpTime conflicts with the requirement of a common time frame for all reports which, in general, address multiple devices. In addition, device clocks are not always trustworthy in the first place. Thus, historically, network manager applications have used deltaTime, the network manager clock time between the receipt of successive SNMP responses, for the denominator $(t_{n+1} - t_n)$. If for any reason deltaTime differs significantly from deltaSysUpTime, the calculated rate will be inaccurate. Unfortunately, there are many cases in which deltaTime does in fact differ significantly from deltaSysUpTime.

The most common case occurs when an SNMP response suffers inordinate delays in the agent, the network, or the network manager server. In a typical problem scenario, response$_{n+1}$ is delayed, so the network manager time difference between response$_{n+1}$ and response$_n$ is inordinately large and, if the cause of the delay is momentary, the succeeding network manager time difference between response$_{n+2}$ and response$_{n+1}$ is inordinately small. If these incorrect values are then used to normalize counter differences, e.g., to divide the difference between successive values of an octet counter, this renders the resultant rate calculations incorrect. Typical symptoms include reported utilizations in excess of 100% and alternately large and small values for deltaTime.

To address this problem, the described embodiment generates a corrected value of deltaTime (referred to as the corrected timestamp, $s_n$) that is derived from both deltaTime and deltaSysUpTime. Instead of using deltaTime to time stamp the stored data, it uses this corrected value of deltaTime (i.e., the corrected timestamp, $s_n$) to timestamp the stored data. That is, it writes the corrected time stamp to the database in place of deltaTime and uses those corrected time stamps to normalize counter differences.

In general, the process works as follows. For each poll period the system first uses deltaSysUpTime to compute a next value of the time stamp based on the previous time stamp. If the computed next value of the time stamp does not differ from deltaTime by too much, it uses that next computed value to time stamp the stored data. However, if the next computed value of the time stamp differs from deltaTime by more than some preset amount (either in the positive direction or in the negative direction), it computes a corrected value of deltaSysUpTime (referred to as deltaSysUpTimeP) and uses that corrected value to compute a revised next value of the time stamp, which it then uses to time stamp the stored data.

In essence a correction is only warranted if there is a significant difference between deltaSysUpTime and delta-Time that causes the computed time stamps to get sufficiently far out of synchronization with deltaTime.

In order to determine a tolerance, at the outset the network manager application bounds the difference between the system and device clocks by measuring the time between the transmission of an initial SNMP poll (i.e., $x_0$) and the receipt of the associated response (i.e., $r_0$) based on the network manager clock. The network manager application then uses $r_0$ as the base from which to compute time stamps. This process is called baselining.

If the network manager application detects a large time skew, such as several seconds, the network manager application makes no attempt to correct the time. Rather than store questionable data, it considers the polled data as a missed poll and simply discards it. The network manager application then checks subsequent polls to determine whether the total time skew from the last good poll has resynchronized itself. If the network manager application detects a predefined number of contiguous, excessive time skews, it discards the data for that element and starts all over again, creating a new baseline.

Large time skews occur frequently in environments that use time-synchronization software to reset system clocks on a regular basis. When these system time changes occur, the network manager application considers the change to be a large single time skew for the polled device. Similar problems can occur when time-synchronization servers change the network manager system clock.

Figure 2:
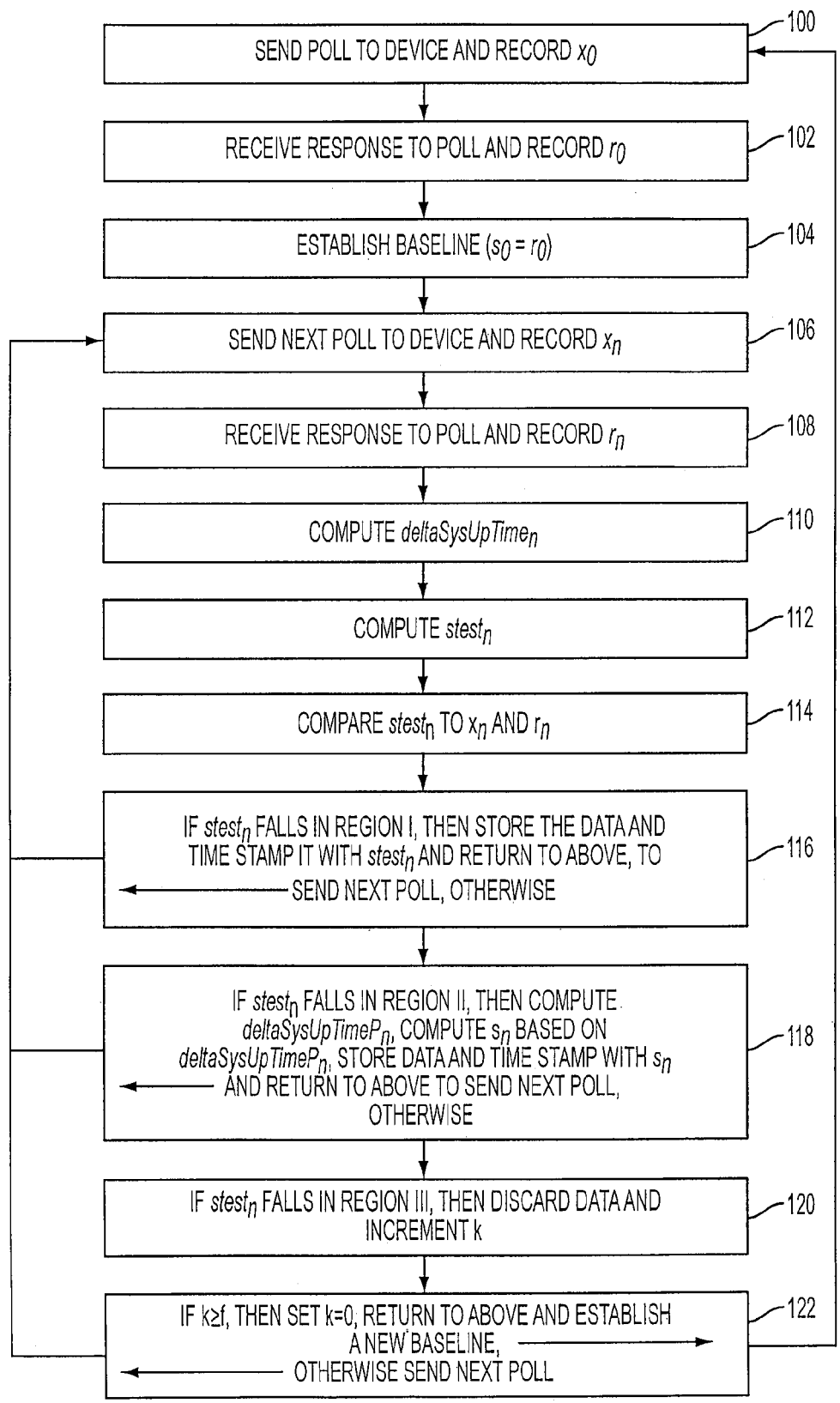
FIG. 2 is a flow diagram of the skew correction algorithm.

The time skew correction algorithm, which is shown in FIG. 2, will now be described in greater detail. In this description, the following parameters are used:

$x_n$ is the time at which the NMS transmits poll n (based on the NMS clock).

$r_n$ is the time at which the NMS receives the response to poll n (based on the NMS clock).

$s_n$ represents an accumulated time that the NMS writes to the database at poll n, where $s_0 = r_0$ deltaSysUpTime$_n$ is the measured time difference between initiating the response to poll n−1 and initiating the response to poll n (based on the device clock).

deltaSysUpTimeP$_n$ is a corrected version of deltaSysUp-Time$_n$ designed to correct the time stamp that is computed for the stored data.

$w_0 = r_0 - x_0$ represents the time it takes to receive a response to a poll of the device.

$e_c$ represents the estimated device clock wobble error.

$w = w_0 + 2e_c$ is a measure of total permitted time error, including device clock wobble.

δ represents the maximum possible time skew which will be corrected by the algorithm.

ρ represents a maximum time correction that can be applied for any given poll.

Initially, the NMS which is running the skew correction algorithm establishes a baseline for the polled device and while doing so measures various parameters that will be used to set thresholds for when adjustments to the computed time stamps will be required and/or permitted. It first sends an initial poll (n=0) to the device at time $x_0$ and stores that time for later use (step 100). At some later time $r_0$, it receives a response to the initial poll it sent at time $x_0$ and it stores the received time, $r_0$, as measured by the NMS's time clock (step 102). The response from the polled device also includes a time stamp that was applied by the polled device using its own clock and indicating when the response was sent to the NMS. The NMS stores the time stamp from the polled device. Using the stored values for $r_0$ and $x_0$, it computes the variable w in the manner indicated by the above equations; it sets a computed time stamp parameter, $s_0$, equal to $r_0$; it stores the received data that was responsive to that poll; and it time stamps the stored data with $s_0$ (step 104). In other words, for the first poll, it uses the local clock to time stamp the stored data.

Once the baseline has been established, the NMS then constructs the time stamps that are to be applied to subsequent received polled data by accumulating increments of time that are based on time as measured by the polled device. When an excessive skew is detected (as determined below) then the increment for that poll is corrected in manner designed to reduce the detected skew. The process works as follows.

At some appropriate later time, $x_n$, determined by the polling interval that has been established for the NMS (e.g. every five minutes), the NMS sends the first poll after establishing the baseline; it stores the time at which that poll is sent ($x_n$, where n=1) and it waits to receive the response to that first poll (step 106). Upon receiving the response, it stores the time at which the response was received ($r_n$, where n=1); and it stores the time stamp that was applied by the polled device (step 108). It then computes a value for the variable, SysUpTime$_n$, which is equal to the difference between the time at which the response to this poll was initiated and the time at which the response to the previous successful poll was initiated, as measured by the clock on the polled device (step 110).

After it has computed deltaSysUpTime$_n$, it computes an initial value for a variable, stest, by using the following equation (step 112):

$$stest = s_{n-1} + deltaSysUpTime_n$$

Since n=1 for this poll, the value of $s_{n-1}$ is $r_0$, as previously determined for the initial poll. So, for this first poll the computed value of stest equals $r_0$ + deltaSysUpTime$_1$.

Next, the NMS compares the value of stest to the previously stored values for $x_n$ and $r_n$ to determine whether to compute a time stamp for the received data and, if so, how to compute the time stamp (step 114). During this phase, the NMS uses a number of thresholds to determine what action to take.

Figure 3:
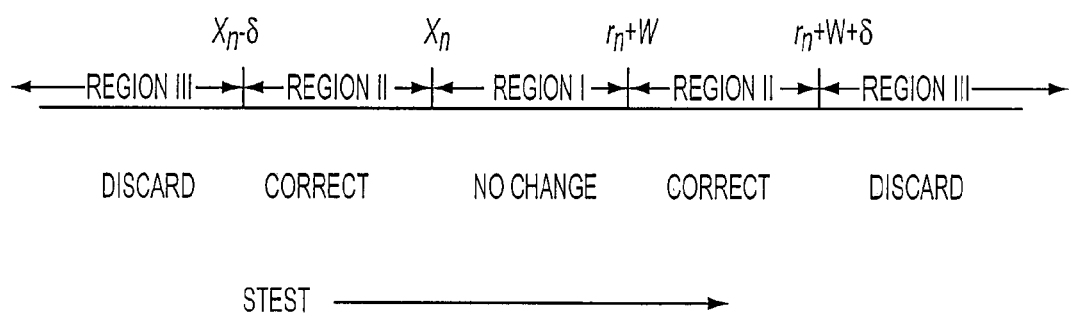
FIG. 3 depicts the thresholds that are applied to the stest variable.

The thresholds are illustrated diagrammatically in FIG. 3. In this diagram, the upper horizontal line represents a timeline from the perspective of the local clock on the NMS. As previously indicated, $x_n$ and $r_n$ are the times at which the current poll was sent and received, respectively. The timeline is divided into regions, namely, Region I, Region II and Region III. If the value of stest falls within the portion of the timeline designated as Region I, then no corrections are made to deltaSysUpTime$_n$ and it is used to compute the time stamp (step 116). If stest falls within any portion of the timeline that is designated as Region II, then a correction will be applied to deltaSysUpTime$_n$ and the corrected value will be used to compute the time stamp (step 118). Finally, if stest falls within any portion of the timeline that is designated as Region III, the skew is considered to be too large for correction, the data for that poll is discarded and no time stamp is computed (step 120). The details of what is done in each of these regions are as follows:

If stest falls within Region I that indicates that the time stamp that is computed based on the device clock is relatively close to the time stamp that one would have expected from the local clock (i.e., the lock on the NMS). Note that the midpoint, A, of Region I is at:

$$(x_n+r_n+w)/2=[(x_n+r_n)/2]+[w/2]$$

In other words, it is approximately the time as measured from the perspective of the NMS at which one would have predicted that the polled device initiated its response. This, of course, assumes that there were equal delays in both the send and received directions or, stated differently, that the response took as long to get to the NMS as the poll took to get to the polled device. So, in this case deltaSysUpTime$_n$, without any corrections, is used to compute the time stamp.

If stest falls within Region II one of two things happens depending on whether stest is greater that $r_n+w$ or less than $x_n$.

In the event that stest is less than $x_n$ then the following occurs:

---
If ( $x_n - \delta \leq$ stest < $x_n$ ) then
    { correction = min ( $\rho$, ½( $x_n + r_n + w$ ) − stest)
      deltaSysUpTimeP$_n$ = deltaSysUpTime$_n$ + correction
      S$_n$ = S$_{n-1}$ + deltaSysUpTimeP$_n$
    }
---

That is, a corrected time increment deltaSysUpTimePn is computed by applying a correction to deltaSysUpTimen and this corrected time increment is added to the time stamp computed for the last successful poll to arrive at the time stamp for the current received data. The correction that is applied is designed to move sn closer to the previously mentioned midpoint, A. The correction is equal to the distance between the midpoint A and stest but it is not permitted to be any larger than $\rho$. In other words, if the skew is larger than can be corrected by applying $\rho$, then the process of reducing the skew to an acceptable amount will take multiple poll cycles (i.e., it will be incrementally corrected).

In the event that stest is greater than $r_n+w$ then the following occurs:

---
If ( $r_n + w \leq$ stest < $r_n + w + \delta$ ) then
    { correction = min ( $\rho$, stest − ½( $x_n + r_n + w$ ) )
      deltaSysUpTimeP$_n$ = deltaSysUpTime$_n$ − correction
      S$_n$ = S$_{n-1}$ + deltaSysUpTimeP$_n$
    }
---

This is similar to what happened when stest is less than $x_n$, except in this case the correction is subtracted from deltaSysUpTime$_n$ to arrive at a value for deltaSysUpTimeP$_n$, instead of being added to it.

In the event that stest falls within region III, then the skew is viewed as being too great for correction and the polled data is simply discarded as though a missed poll had occurred and the process starts over for the next poll. The value of stest can fall in Region III if stest<$x_n-\delta$ or if stest$\geq r_n+w+\delta$. When this occurs, the NMS increments a parameter k, which keeps track of how many consecutive times the polled data has been discarded. If k reaches a preset limit, then it is assumed that the skew cannot be corrected and the system returns to the beginning of the process to establish a new baseline and begin the process anew (step 122). It also resets k to zero. (Note that steps 118 and 120 also automatically rest k to zero.)

As can be seen from the above description the sequence of time stamps that are computed for the stored data can be expressed as follows:

$$s_n = r_0 + \sum_{j=1}^{n} deltaSysUpTimeP_j$$

which is equivalent to:

$$s_n = s_{n-1} + deltaSysUpTimeP_n$$

In other words, the system uses deltaSysUpTimeP$_n$ to calculate s$_n$ and also to normalize counter data.

The NMS performs this algorithm for each polled device to time stamp the stored data received from that device.

The operation of the time skew correction algorithm is controlled by the following environment variables:

ENABLE: This variable enables or disables the time skew correction algorithm. The default value is YES, which means that the time skew check is disabled and the network manager application uses raw values of deltaTime to normalize counters. A value of NO enables the algorithm which means that the corrected time stamps are used to normalize counters.

RESTART: This variable defines the number of allowable contiguous time skews before the network manager application discards the polled data and reestablishes the baseline. When the network manager application detects an inordinately large time skew, it discards the polled data and considers the poll to be a missed poll. If the network manager application detects that the past several contiguous polls (i.e., m polls) are skewed, it creates a new baseline for the element. Valid values for m are any integer greater than or equal to 1. In the described embodiment, the default value is 3.

MAX_SKEW: This variable is the maximum possible time skew that will be corrected by the algorithm, expressed as a percentage of the poll period. It is effectively a sanity check on the correction and can take any integral value from 1 and 100. The default value is 5 (which represents 5% of the poll period or 15 seconds for five-minute poll period).

In addition to the environment variables, there are two configuration parameters associated with the algorithm, namely, e$_c$, and $\rho$. The parameter e$_c$, is the estimated device clock wobble error in seconds (default 0.5 seconds). And the parameter $\rho$ is the maximum time correction that is permitted as a fraction of the poll period (default ¹⁄₄₀₀ of the poll period or 0.75 seconds for a five-minute poll period).

Other embodiments are within the following claims.

What is claimed is:

1. A method of processing data received at a local system in response to polling a remote device, wherein the local system includes a local clock, said method comprising:
    sending a first poll to the remote device;
    receiving a response from the remote device to the first poll, said response to the first poll containing data and a time stamp indicating when the remote device responded to the first poll;
    for the data received in response to the first poll, computing a first time by using both a response receipt time that was derived from the local clock for a previous poll of the remote device and also the time stamp contained in the response to the first poll;

comparing the computed first time to information that the local system stored in connection with the first poll, wherein said information that the local system stored in connection with the first poll was derived from the local clock; and determining how to process the data received in response to the first poll based on comparing the computed first time to said information that the local system stored in connection with the first poll.

2. The method of claim 1, wherein sending the first poll also involves storing a first poll transmit time that is derived from the local clock.

3. The method of claim 2, wherein receiving the response to the first poll also involves storing a first poll response receipt time that is derived from the local clock.

4. The method of claim 3, wherein the information that the local system stored in connection with the first poll includes both the first poll transmit time and the first poll response receipt time.

5. The method of claim 1, further comprising generating the information in connection with the first poll, wherein the information includes a first poll transmit time and a first poll response receipt time, both of which are derived from the local clock.

6. The method of claim 1, wherein determining how to process the data received in response to the first poll involves determining whether the computed first time falls within a first range derived from said information; and if the computed first time falls within the first range derived from said information then storing the data received in response to the first poll and time stamping the stored data with the computed first time.

7. The method of claim 6, wherein determining how to process the data received in response to the first poll involves:

determining whether the computed first time falls outside of the first range but within a second range that is also derived from said information; and if the computed first time falls outside of the first range but within the second range, applying a correction to the computed first time to generate a first corrected time, storing the data received in response to the first poll, and time stamping the stored data with the first corrected time.

8. The method of claim 7, wherein determining how to process the data received in response to the first poll involves:

determining whether the computed first time falls outside of the second range; and if the computed first time falls outside of the second range, discarding the data received in response to the first poll.

9. The method of claim 1, wherein determining how to process the data received in response to the first poll involves:

determining whether the computed first time falls outside of a first range but within a second range, both of which first and second ranges are derived from the said information; and if the computed first time falls outside of the first range but within the second range, applying a correction to the computed first time to generate a first corrected time, storing the data received in response to the first poll, and time stamping the stored data with the first corrected time.

10. The method of claim 1, wherein determining how to process the data received in response to the first poll involves:

determining whether the computed first time falls outside of a first range that is derived from the said information; and if the computed first time falls outside of the first range, discarding the data received in response to the first poll.

11. The method of claim 1, wherein sending the first poll involves using SNMP to send the poll.

12. The method of claim 1, wherein sending the first poll involves polling a MIB stored at the remote device.

13. The method of claim 1, wherein sending the first poll involves polling the remote device for a counter value.

14. The method of claim 1, wherein sending the first poll involves polling a monotonically increasing counter at the remote device.

15. A computer readable medium storing a program which when executed on a processor in a computer system that includes a local clock causes the computer system to:

send a first poll to a remote device;

receive a response from the remote device to the first poll, said response to the first poll containing data and a time stamp indicating when the remote device responded to the first poll;

for the data received in response to the first poll, compute a first time by using both a response receipt time that was derived from the local clock for a previous poll of the remote device and also the time stamp contained in the response to the first poll;

compare the computed first time to information that the local system stored in connection with the first poll, wherein said information that the local system stored in connection with the first poll was derived from the local clock; and determine how to process the data received in response to the first poll based on comparing the computed first time to said information that the local system stored in connection with the first poll.

16. The computer readable medium of claim 15, wherein the stored program also causes the system to store a transmit time for the first poll that is derived from the local clock.

17. The computer readable medium of claim 16, wherein the stored program also causes the system to store a receipt time for the first poll response that is derived from the local clock.

18. The computer readable medium of claim 17, wherein the information that the local system stored in connection with the first poll includes both the first poll transmit time and the first poll response receipt time.

19. The computer readable medium of claim 15, wherein the stored program also causes the system to generate the information in connection with the first poll, wherein the information includes a transmit time for the first poll and a receipt time for the response to the first poll, both of said transmit and receipt times being derived from the local clock.

20. The computer readable medium of claim 15, wherein the stored program causes the system to determine how to process the data received in response to the first poll by:

determining whether the computed first time falls within a first range derived from said information; and if the computed first time falls within the first range derived from said information then storing the data received in response to the first poll and time stamping the stored data with the computed first time.

21. The computer readable medium of claim 20, wherein the stored program also causes the system to determine how to process the data received in response to the first poll by:

determining whether the computed first time falls outside of the first range but within a second range that is also derived from said information; and if the computed first time falls outside of the first range but within the second range, applying a correction to the computed first time to generate a first corrected time, storing the data received in response to the first poll, and time stamping the stored data with the first corrected time.

22. The computer readable medium of claim 21, wherein the stored program also causes the system to determine how to process the data received in response to the first poll by:
   determining whether the computed first time falls outside of the second range; and
   if the computed first time falls outside of the second range, discarding the data received in response to the first poll.

23. The computer readable medium of claim 15, wherein the stored program causes the system to determine how to process the data received in response to the first poll by:
   determining whether the computed first time falls outside of a first range but within a second range, both of which first and second ranges are derived from the said information; and
   if the computed first time falls outside of the first range but within the second range, applying a correction to the computed first time to generate a first corrected time, storing the data received in response to the first poll, and time stamping the stored data with the first corrected time.

24. The computer readable medium of claim 15, wherein the stored program causes the system to determine how to process the data received in response to the first poll by:
   determining whether the computed first time falls outside of a first range that is derived from the said information; and
   if the computed first time falls outside of the first range, discarding the data received in response to the first poll.

25. A method of processing data received at a local system in response to polling a remote device, wherein the local system includes a local clock and the remote device includes a remote device clock, said method comprising:
   sending a first poll to the remote device at a first poll transmit time that is derived from the local clock;
   receiving a response from the remote device to the first poll at a first poll response receipt time derived from the local clock, said response to the first poll containing first data and a first time stamp indicating when the remote device responded to the first poll, wherein said first timestamp is based on the remote device clock;
   sending a second poll to the remote device at a second poll transmit time that is derived from the local clock;
   storing the second poll transmit time at the local system;
   receiving a response from the remote device to the second poll at a second poll response receipt time derived from the local clock, said response to the second poll containing second data and a second time stamp indicating when the remote device responded to the second poll, wherein said second timestamp is based on the remote device clock;
   storing the second poll response receipt time at the local system;
   for the second data received in response to the second poll, computing a first time by using both the first poll response receipt time derived from the local clock and the second timestamp based on the remote device clock;
   comparing the computed first time to the stored second poll transmit time and stored second poll response receipt time; and
   determining how to process the second data received in response to the second poll based on comparing the computed first time to the stored second poll transmit time and stored second poll response receipt time.

26. The method of claim 25, wherein determining how to process the second data received in response to the second poll comprises determining whether the computed first time falls within a first range derived from the stored second poll transmit time and stored second poll response receipt time; and if the computed first time falls within the first range then storing the second data received in response to the second poll and time stamping the stored second data with the computed first time.

27. The method of claim 26, wherein determining how to process the second data received in response to the second poll involves:
   determining whether the computed first time falls outside of the first range but within a second range that is also derived from the stored second poll transmit time and stored second poll response receipt time; and
   if the computed first time falls outside of the first range but within the second range, applying a correction to the computed first time to generate a first corrected time, storing the second data received in response to the second poll, and time stamping the stored second data with the first corrected time.

28. The method of claim 27, wherein determining how to process the second data received in response to the second poll involves:
   determining whether the computed first time falls outside of the second range; and
   if the computed first time falls outside of the second range, discarding the second data received in response to the second poll.

29. The method of claim 25, wherein determining how to process the second data received in response to the second poll involves:
   determining whether the computed first time falls outside of a first range but within a second range, both of which first and second ranges are derived from the stored second poll transmit time and stored second poll response receipt time; and
   if the computed first time falls outside of the first range but within the second range, applying a correction to the computed first time to generate a first corrected time, storing the second data received in response to the second poll, and time stamping the stored second data with the first corrected time.

30. The method of claim 25, wherein determining how to process the second data received in response to the second poll involves:
   determining whether the computed first time falls outside of a first range that is derived from the stored second poll transmit time and stored second poll response receipt time; and
   if the computed first time falls outside of the first range, discarding the second data received in response to the second poll.

* * * * *